April 21, 1959 P. FIORENTINI 2,883,149
BUTTERFLY VALVE FOR FLUIDS UNDER HIGH PRESSURE
Filed Dec. 20, 1954 2 Sheets-Sheet 1

INVENTOR:
Pietro Fiorentini
BY
Patent Agent

April 21, 1959      P. FIORENTINI      2,883,149
BUTTERFLY VALVE FOR FLUIDS UNDER HIGH PRESSURE
Filed Dec. 20, 1954      2 Sheets-Sheet 2
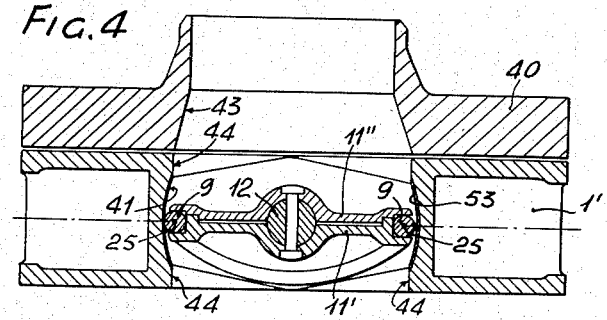
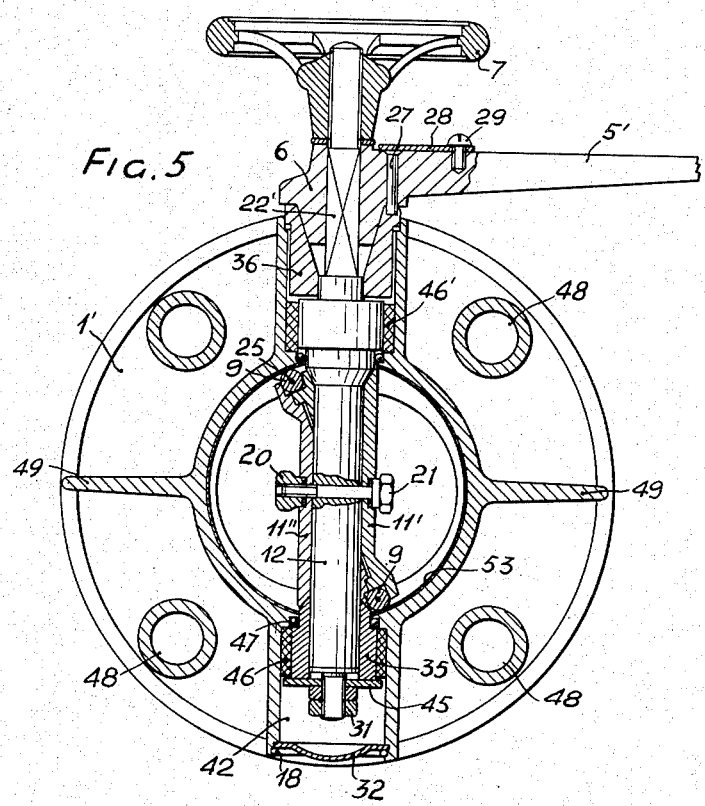

United States Patent Office 2,883,149
Patented Apr. 21, 1959

2,883,149

BUTTERFLY VALVE FOR FLUIDS UNDER HIGH PRESSURE

Pietro Fiorentini, Milan, Italy

Application December 20, 1954, Serial No. 476,319

Claims priority, application Italy March 6, 1954

4 Claims. (Cl. 251—306)

The present invention relates to a valve, especially of the butterfly type.

It is an object of this invention to provide a valve of this type, which secures an improved closure of the conduits of fluids under pressure, while at the same time reducing the dimensions and weight of the valve.

The valve according to the invention is characterized by the combination of a butterfly seat formed by an equatorial zone having a spherical-concave surface and a movable butterfly body having a peripheral surface at least partly spherical-convex to fit the said seat, while between the said two opposing surfaces of the seat and butterfly, there is interposed at least one internally reinforced elastic material ring anchored in a groove provided in one of said surfaces.

More specifically, the valve according to the invention comprises a stationary body including a wide base cylinder and a truncated cone forming the attachment flange. From the cylindrical part stand out the control means, such as a screw locking handwheel and an operating lever for regulating the flow of the fluid, while inside of the said body there is housed a butterfly.

The interior of the cylindrical body is highly polished over a central zone of a spherical surface, constituting a cavity adapted to receive the butterfly valve, which while turning within this spherical surface zone keeps at all times a perfect and constant contact with it, without any change in the stresses to which the elastic materials forming parts of the butterfly valve are subjected.

The accompanying drawings show, by way of example only, some embodiments of a butterfly valve according to the present invention.

Fig. 4 is a section taken transversely to the operating shaft of a simplified form of valve in its closed position.

Fig. 5 is a longitudinal section with respect to the operating shaft of the valve represented in Fig. 4, the valve being shown in its open position.

Figure 1:
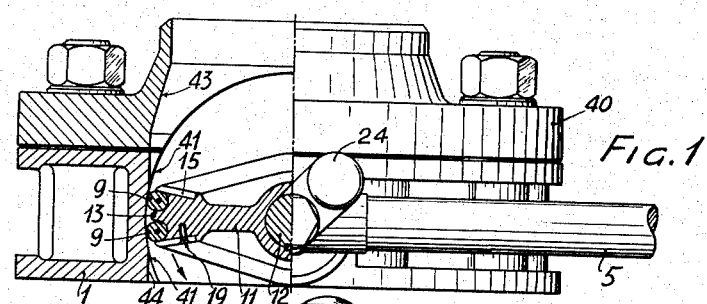
Fig. 1 is a cross section taken at right angles with regard to the axis of operation of the butterfly, the valve being shut.
Figure 2:
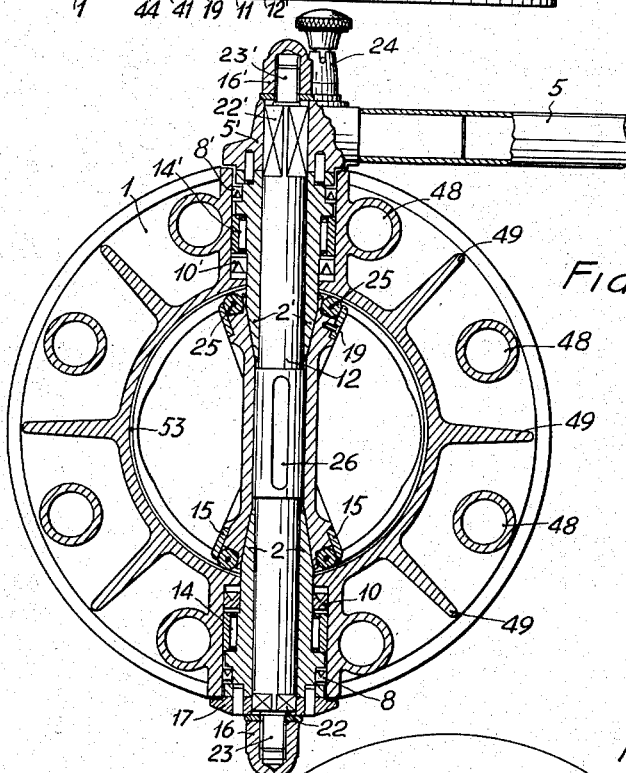
Fig. 2 illustrates a section in a longitudinal direction in respect to the butterfly operating shaft axis, the valve being open.

According to the embodiment of the invention shown in Figs. 1 and 2, the annular body 1, which is the valve seat is connected to the pipe coupling flange 40 by means of bolts, a sealing gasket, not shown, being interposed. The body 1 has a spherical-concave inner surface 41 forming a seat for the disc-shaped butterfly valve 11. Valve 11 is provided with a tubular enlargement through which passes the operating shaft 12. This tubular enlargement tapers from the marginal portions thereof toward the central portion of the valve member 11.

Figure 3:
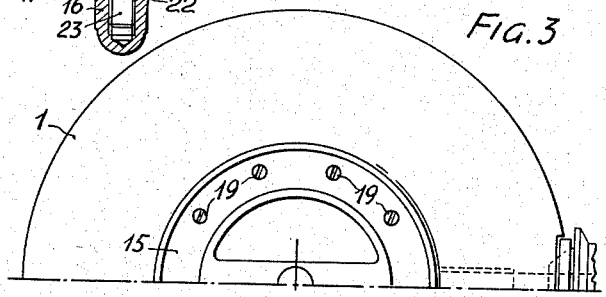
Fig. 3 is a part front view of the valve in its closed position.

The valve member 11 has a peripheral surface whose width is non-uniform. This surface is provided with two marginal symmetrical L-shaped grooves, separated from each other by a rib 13 and formed to receive and house two rubber packings 9 reinforced with a steel wire core 25 or the like. These packings or seals contact the spherical surface seat 41 which is the zone of operation of the butterfly valve. These two packings 9 are held in the valve member 11 by means of two flat rings 15 and screws 19 (Fig. 3). Spherical seat 41 has a highly polished and hardened lining 53 of chromium of a certain thickness to prevent any possibility of corrosion of the seat, either due to the passage of the fluid or due to friction during the operation of the butterfly.

At both sides of the spherical zone 41, two cylindrical surfaces 44 are provided. Shaft 12 and butterfly valve member 11 are firmly connected to each other by means of a key 26 so that valve member 11 rotates with shaft 12.

The valve member 11 is adapted to be actuated by means of an operating lever 5 which is operably connected for rotating shaft 12. Shaft 12 is axially fixed to the valve member 11 by means of the tapered bushings 2, 2' secured by the nuts 16, 16'. The bushings 2, 2' are provided with peripheral grooves to receive and hold packings 8, 8', 10, 10' as well as roller bearings 14, 14'.

One end of shaft 12 is provided with a square section 22 engaged by a cover 17 and with an axial threaded projection 23 upon which the nut 16 is screwed.

The other end of shaft 12 has a square section 22' engaged by the head 5' of lever 5, and is furthermore provided with a threaded axial projection 23' upon which nut 16' is screwed.

A locking pin arrangement 24 located on the head 5' of the lever 5 serves to lock and unlock the operating lever 5, which can accomplish displacements as large as 360°.

The valve according to the invention is characterized in particular by the behavior of the two rubber packings 9 with rigid or elastic steel core.

When the valve is shut, the fluid pressure conveyed through the truncated cone-shaped mouth 43 acts directly upon the adjacent packing 9 and brings about a flattening of the exposed section of said packing or seal 9, thereby creating in the adjacent circular face of the packing a deformation engaging the valve seat 41 along an enlarged surface. When turning the butterfly valve member slowly, the two packings move closer to and opposite points located at the end of the spherical surface zone 41, and eventually move off the spherical surface when they reach the cylindrical surface portions 44. At this point the fluid begins to flow, as soon as the small quantity of liquid entrapped between the two packings 9 has been released.

When closing the valve by means of lever 5, the two packings 9 re-enter the spherical valve seat 41 and prevent further passage of fluid. The flanges 40 for connecting the valve with a pipe system have a tapered portion 43 so as to maintain the same passage section and to compensate for the obstruction by the valve. The packings 9 which may be of a cross section different from a circular cross section, are internally reinforced by a steel wire 25 or the like, either rigid or elastic, in order, at the time of the opening and closing of the valve, when the flow speed increases due to the reduced section, to prevent the fluid pressure from pulling the packings from their place.

The butterfly valve shown in Figs. 4 and 5 is preferably employed for medium pressures.

The outer body consists of an annular part 1 having a surface comprising a spherical-concave zone 41 delimited at its sides by cylindrical sections 44 as in the example of Figs. 1 and 2.

To facilitate its construction, the disc-like member forming the butterfly is divided into two parts 11' and 11" containing at their periphery a single rubber packing ring 9 reinforced by steel wire 25 or the like. The two parts constituting the butterfly are fixed to the shaft 12 by means of a bolt 21 with nut 20. At the lower part, the shaft 12 holds the disc-like member 11'—11" by means of a bushing 35 having a cone-shaped end which is pressed against member 11', 11" by a washer 45 and by nuts 16. Around the bushing 35 there is a cylindrical ring 46 acting as a bearing and a round packing 47. The lower cavity 42 for the passage of shaft 12 is closed by an annular cap 17 hold in its place by a spring ring 18.

The actuating members are at the top. The lever 5' works with its head 6 in the female truncated cone 36 and is locked to it or unlocked by tightening or loosening the handwheel 7 screwed onto the upper end of the operating shaft 12. The lever head 5' is adapted to actuate the shaft 12 by means of the square hole in it which engages the square section 22' of the shaft 12 which allows to to longitudinally slide on the shaft, though remaining in rotational engagement with it. A flat spring 28 fixed by a screw 29 to the lever 5' presses onto a pin 27 serving to lock said lever at desired points by engaging in relative notches cut in cone 36.

In Figs. 1 to 5 the numeral 48 designates the holes for the coupling of the flanges 40 to the pipe system and the numeral 49 designates the radial reinforcing ribs of the body 1'. In the embodiment shown in Figs. 4 and 5, the valve members 11', 11" forming the walls of the butterfly, face each other along a plane cutting the shaft 12 on a slant, and the single packing 9 is clamped in a throat formed by the L-shaped opposite marginal grooves provided in the two parts 11' and 11". Naturally, also more than two packing may be employed, according to the pressures to which the valve will be subjected.

The packings can also be housed, instead of in the butterfly, in suitable grooves formed in the spherical seat 41 of the body 1'.

The bronze bushings 46—46' in Fig. 5 surrounding the operating shaft 12 may be replaced for medium and high pressures by suitable roller bearings as shown in Fig. 2 according to the charge and pressure to be supported thereby reducing the friction due to the rotational movements of the valve, thus facilitating its operation.

What I claim is:

1. In a valve, especially for fluid and incoherent material, particularly under high pressure: a butterfly valve member having a non-uniform width and having its outer edge provided with grooves, said valve member being respectively provided at opposite marginal sections thereof with two female cone-shaped frustums, resilient sealing rings arranged in said grooves, a casing defining a valve seat comprising a spherical concave surface for sealing engagement with said rings, a shaft mounted in said casing and connected to said valve member which is slidably mounted axially on said shaft for rotating same and two bushings mounted on said shaft and rotatably mounting same in said casing, said bushings being provided with cone-shaped male frustums pressed into said female frustums for securing said valve member against sliding movement along the axis of said shaft.

2. In a valve, especially for fluid and incoherent material, particularly under high pressure: a casing defining a valve seat with a spherical concave surface, a shaft mounted in said casing, a disc-shaped butterfly valve member having an enlarged central tubular portion surrounding said shaft and connected thereto for rotation therewith, said valve member being slidable on said shaft in axial direction thereof, said valve member having a reduced thickness at diametrically opposed marginal areas provided with at least one groove, at least one resilient sealing ring mounted in said groove for sealing engagement with said valve seat, said enlarged central portion being provided with oppositely located female cone-shaped frustums, and two bushings mounted on said shaft and rotatably mounting same in said casing, said bushings being provided with cone-shaped male frustums pressed into said female frustums for securing said valve member against sliding movement on said shaft in axial direction thereof.

3. In a valve, especially for fluid and incoherent material, particularly under high pressure: a casing defining a valve seat with a spherical concave surface, a shaft mounted in said casing, a butterfly valve member having a non-uniform width and having its outer edge provided with recesses of L-shaped cross section, said valve member being respectively provided at opposite marginal sections thereof with two female cone-shaped frustums, and being slidably mounted on said shaft but connected thereto for rotation with said shaft, resilient sealing rings arranged in said recesses for sealing engagement with said valve seat, plate means connected to said valve member at said recesses to supplement the same to form a groove and laterally engaging said sealing rings for holding the same in said recesses, two bushings mounted on said shaft and rotatably mounting same in said casing, said bushings being provided with cone-shaped male frustums pressed into said female frustums for securing said valve member against sliding movement on said shaft in axial direction thereof.

4. In a valve, especially for fluid and incoherent material, particularly under high pressure: a valve casing having a spherical valve seat, a rotatable shaft supported by said valve casing and extending transverse to and through the space confined by said valve seat, a pair of bushings respectively mounted on the end portions of said shaft and rotatably mounting same in said casing, said bushings respectively being provided with inwardly tapering cones, a butterfly disc-shaped valve member having a central tubular portion surrounding the central portion of said shaft and being slidable thereon, said valve member being provided with a cone at each end of said tubular portion for receiving said inwardly tapering cones for securing said valve member against sliding movement on said shaft in axial direction thereof, key means rotatably interconnecting said shaft and said valve member, said valve member being provided with grooves at oppositely located marginal sections thereof, and resilient sealing ring means housed in said grooves for cooperation with said valve seat.

References Cited in the file of this patent

UNITED STATES PATENTS

| | | |
|---|---|---|
| 965,999 | Faget | Aug. 2, 1910 |
| 1,744,798 | Price | Jan. 28, 1930 |
| 2,058,996 | Kollberg | Oct. 27, 1936 |
| 2,273,379 | Searles | Feb. 17, 1942 |
| 2,585,556 | Johnson | Feb. 12, 1952 |
| 2,661,182 | Kipp | Dec. 1, 1953 |

FOREIGN PATENTS

| | | |
|---|---|---|
| 12,293 | Great Britain | of 1906 |
| 151,541 | Austria | of 1937 |